United States Patent [19]
Johnson

[11] Patent Number: 5,729,430
[45] Date of Patent: Mar. 17, 1998

[54] CORNER PLACEMENT MONITOR STAND

[75] Inventor: Joni Kay Johnson, Sioux City, Iowa

[73] Assignee: Gateway 2000, Inc., North Sioux City, S. Dak.

[21] Appl. No.: 734,503

[22] Filed: Oct. 21, 1996

[51] Int. Cl.⁶ .................. G06F 1/16; H05K 5/02
[52] U.S. Cl. .............. 361/682; 248/917; 312/208.3; 312/223.2; D14/114; 381/88
[58] Field of Search .................. 361/681–683, 361/686, 724, 727; 312/208.1, 208.3, 223.2, 223.3; 248/917–922; 364/708.1; D14/113, 114; 381/24, 87, 88; G06F 1/16

[56] References Cited

U.S. PATENT DOCUMENTS

| | | | |
|---|---|---|---|
| D. 143,426 | 1/1946 | Karp | 33/7 |
| D. 269,749 | 7/1983 | Foster | D6/85 |
| D. 283,323 | 4/1986 | Cervero | D14/114 |
| D. 288,157 | 2/1987 | Sandor | D6/474 |
| D. 290,612 | 6/1987 | Choate et al. | D14/114 |
| D. 290,706 | 7/1987 | Peart et al. | D14/114 |
| D. 291,204 | 8/1987 | Hampshire et al. | D14/114 |
| D. 293,530 | 1/1988 | Wright et al. | D6/510 |
| D. 312,630 | 12/1990 | Esslinger | D14/113 |
| D. 313,133 | 12/1990 | Hassel | D6/474 |
| D. 316,709 | 5/1991 | Howard et al. | D14/114 |
| D. 317,760 | 6/1991 | Esslinger | D14/114 |
| D. 319,822 | 9/1991 | Troke | D14/114 |
| D. 330,892 | 11/1992 | Hassel et al. | D14/114 |
| D. 331,045 | 11/1992 | Moerke | D14/114 |
| D. 336,088 | 6/1993 | Fisher | D14/204 |
| D. 349,107 | 7/1994 | Rude et al. | D14/114 |
| D. 355,647 | 2/1995 | Gresko | D14/114 |
| D. 357,910 | 5/1995 | Newhouse | D14/114 |
| D. 362,246 | 9/1995 | Evenson | D14/114 |
| D. 363,621 | 10/1995 | Eatherly | D6/450 |
| D. 367,387 | 2/1996 | Sweere | D6/511 |
| 2,386,092 | 10/1945 | Cornish | 45/70 |
| 2,605,159 | 7/1952 | Horn | 312/7 |
| 3,858,528 | 1/1975 | Petersen | 108/60 |
| 4,345,803 | 8/1982 | Heck | 312/194 |
| 4,483,572 | 11/1984 | Story | 312/196 |
| 4,624,510 | 11/1986 | Jedziniak | 312/252 |
| 4,709,972 | 12/1987 | LaBudde et al. | 312/208 |
| 4,717,112 | 1/1988 | Pirkle | 248/639 |
| 4,852,830 | 8/1989 | Howard et al. | 248/183 |
| 4,863,124 | 9/1989 | Ball et al. | 108/28 |
| 5,062,609 | 11/1991 | Hames | 248/676 |
| 5,265,952 | 11/1993 | Greshem et al. | 312/312 |
| 5,290,099 | 3/1994 | Lechman | 312/208.1 |
| 5,408,939 | 4/1995 | Lechman | 108/107 |
| 5,437,235 | 8/1995 | Randolph | 108/25 |
| 5,587,876 | 12/1996 | O'Brien et al. | 361/682 |
| 5,604,663 | 2/1997 | Shin et al. | 361/686 |

*Primary Examiner*—Lynn D. Feild
*Attorney, Agent, or Firm*—Schwegman, Lundberg, Woessner & Kluth, P.A.

[57] ABSTRACT

The present invention comprises a portable monitor riser shaped in a modified triangle configuration to use in a corner workstation location, with a turntable thereon. The monitor riser provides convenient component storage capabilities, convenient access to electronic peripheral devices, and a professional appearance.

8 Claims, 3 Drawing Sheets

CORNER PLACEMENT MONITOR STAND

FIELD OF THE INVENTION

The present invention relates generally to a computer monitor riser, and more specifically to a monitor riser which fits within a corner.

BACKGROUND OF THE INVENTION

Designers of modern offices have attempted to maximize the efficient use of space through utilization of modular desk units and walls. While these units permit many operators to work in a small area, the desk area of each operator is severely limited. The widespread use of computers in office applications has given rise to having an individual computer system, including a monitor, keyboard, and mouse, on each operator's desk. Although the individual computers may have increased operator's efficiencies in completing work, they have decreased the amount of desk space available to each operator.

Computer monitors alone do not occupy a significant amount of desk space. Although, a monitor placed on a desk does not provide a comfortable viewing height of a monitor screen. Desk top computer cases are often used to raise the level of a computer monitor to an ergonomically acceptable level. However, a computer system used in this manner occupies a significant amount of the operator's desk top space.

In an effort to increase desk space, manufacturers have produced computer system cases that fit beneath the desk. Since the monitor no longer sat atop the desk top computer case, the monitor was uncomfortably lowered relative to the operator's eye level. As a solution, operators used various items found in the office, such as piles of paper or catalogs, to raise the monitor to an appropriate level, which did not subtract from the work area beyond the monitor. The piles of paper and the like proved to be an unstable support for the monitor and were unsightly in the office area.

Placing the system case beneath the desk introduced a further problem. Users need frequent access to removable media, and that is made difficult by placing the case under the desk.

Monitor riser stands are generally known in the art. However, these prior art monitor stands have rectangularly shaped foot prints, so that the stand is most efficiently placed adjacent a flat surface, such as a wall, or in a large open space. Furthermore, the monitor stands are very limited in function. They merely provide a higher surface for monitors and perhaps provide keyboard storage.

Computer work station furniture is also known in the art. The furniture is designed to accommodate and provide positioning flexibility for desk top computers and wiring for the computers. The work station furniture has several intricate adjustment features which are both complicated and expensive, resulting in high cost computer furniture. Additionally, the computer work station furniture cannot be used in conjunction with existing office furniture, nor can the location of the computer system be easily moved on top of the work station. The operator is constrained to locate a computer in a particular location within a desk, and little or no lateral movement is allowed.

One such computer work station is disclosed in U.S. Pat. No. 5,437,235 issued Aug. 1, 1995 to Travis M. Randolph. The '235 patent discloses a fixed work surface which has a recess for a monitor, and a monitor lift mechanism having cantilever arms extending out of the recess. Although the work station furniture provides for corner placement of the computer system, including the monitor, the operator is constrained to place the computer system in one location.

There is a need for a better, more efficient way to support a monitor at a comfortable viewing level. There is a further need for reducing the amount of space required on the desk for support of the monitor. There is yet a further need for efficiently housing additional devices, such as electronic media, speakers and communicating devices so that they are easily accessible to a user.

SUMMARY OF THE INVENTION

The present invention comprises a portable monitor stand or riser shaped in a modified triangle configuration to use in a corner workstation location. The monitor riser is relatively simple and portable, provides convenient access to electronic peripheral devices, and has convenient component storage capabilities. The surface panels of the monitor riser accommodate various components, such as speakers. Storage space within the monitor riser is utilized to store keyboards, computer media, and general office supplies. In one embodiment the riser includes a locking front door for security purposes.

In a further embodiment, the top surface of the monitor stand is configured with a rotating surface for monitor positional adjustment. It is a further object to provide a portable monitor riser of the above type which can be adapted to different desk arrangements, gives a professional appearance, and does not occupy a significant area of the desk-top.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
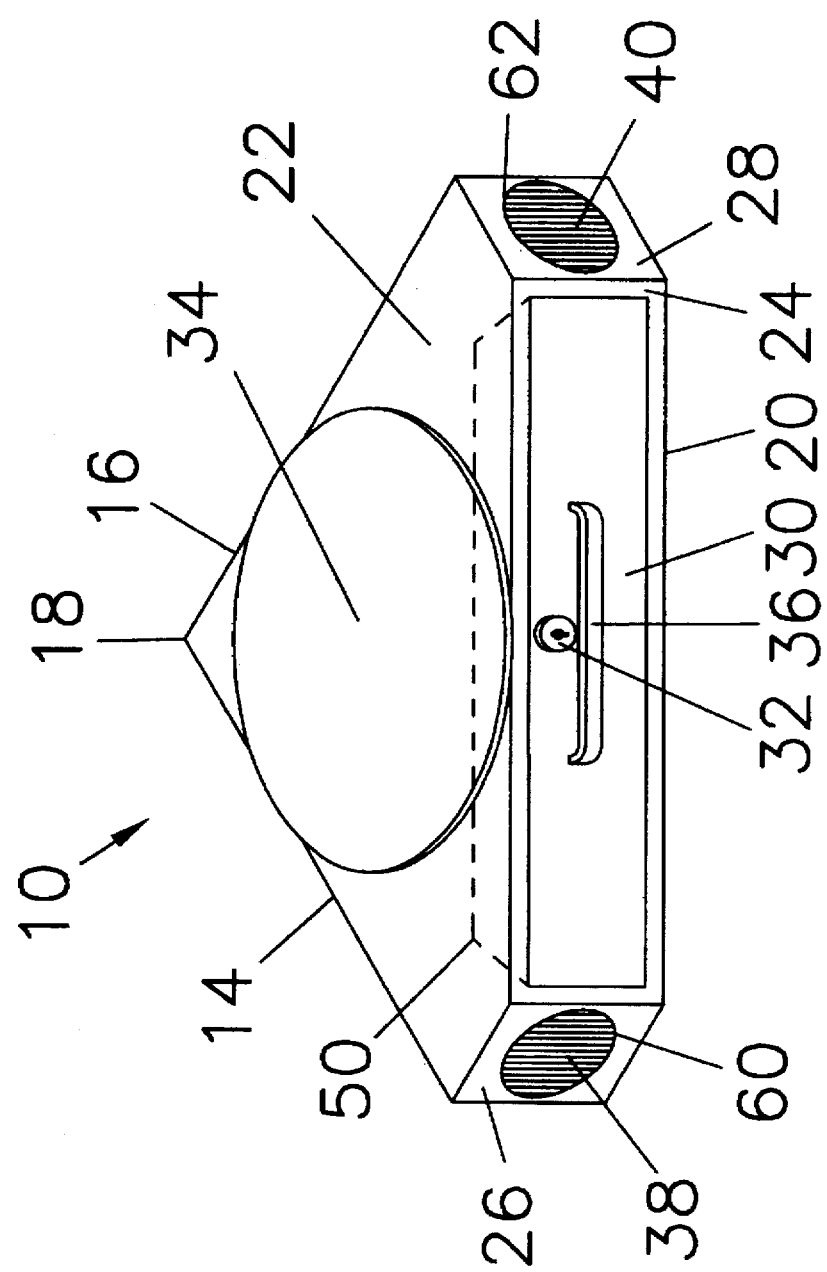
FIG. 1 is a perspective view illustrating a monitor riser constructed in accordance with the present invention.

A portable monitor riser 10 is shown in FIG. 1. The riser 10 comprises two rear side panels 14, 16, two media mounting surfaces 26, 28, a user interface surface 24, a top support surface 22, and a bottom support surface 20. Two first ends of the rear side panels 14, 16 are coupled together at an apex 18. The two rear side panels extend outwardly at about a 90 degree angle from the first two ends at apex 18 to the media mounting surfaces 26, 28. The media mounting surfaces 26, 28 extend angularly disposed at about a 90 degree angle from the rear side panels 14, 16 to form ends of the user interface surface 24.

The top support surface 22 is supported by the rear side panels 14, 16, the user interface surface 24, and the media mounting surfaces 26, 28. The user interface surface 24 extends down from the top support surface between the two media mounting surfaces 26, 28 and has a releasable door 30. The releasable door 30 has a lock 32 for securing the door from unauthorized operators or during transport of the riser 10. A handle 36 is provided on the door 30 to facilitate transportation of the riser 10 when the door 30 is locked, and to provide operator access to a drawer 50. The drawer 50 is connected to the rear surface door 30, such that when door 30 is opened, the operator has access to drawer 50. When the door is shut, drawer 50 is contained within the riser 10. In the preferred embodiment, drawer 50 is rectangular in shape, although a triangle shape is also contemplated by the invention. Drawer 50 provides storage for removable computer media and also standard office supplies.

Figure 2:
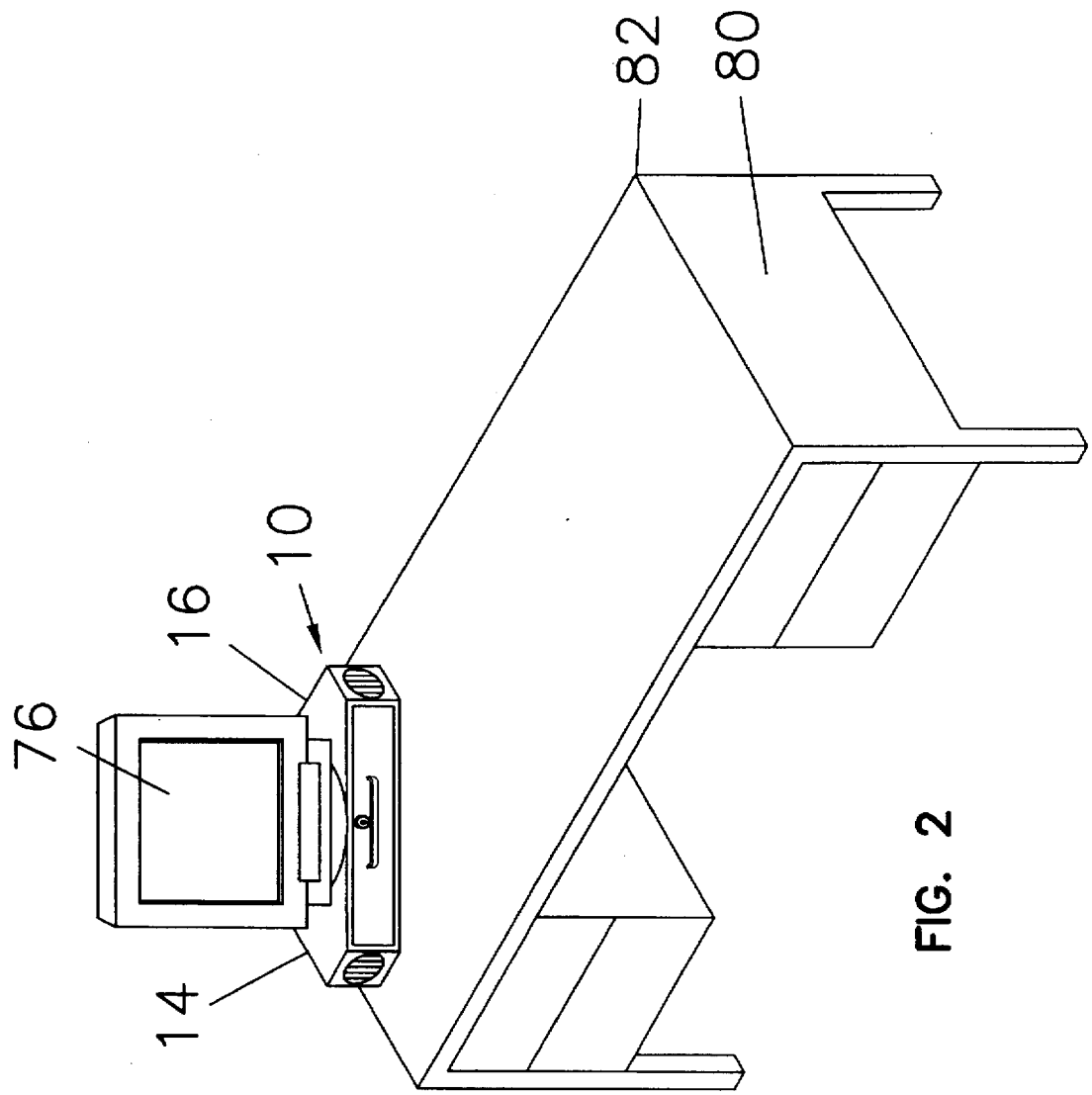
FIG. 2 is a perspective view illustrating the monitor riser positioned on a work surface in accordance with the present invention.

The top support surface 22 supports a turntable 34 to form a rotary base for the monitor 76 (FIG. 2). The turntable 34 is secured to the top support surface 22 so that the turntable 34 remains intact during transport of riser 10 and while the monitor 76 is adjusted. The monitor 76 may be pivotally adjusted on turntable 34, providing alternative viewing angles for the operator.

Media mounting surfaces 26, 28 have openings 60, 62 therein. The speakers 38, 40 are provided within said openings 60, 62 such that the speakers 38, 40 are angularly disposed towards the operator. Wiring for speakers 38, 40 is contained within riser 10, extends through cut out 66 and is attached to the computer system (not shown). The speaker wires are thereby concealed from view. Speakers 38, 40 are within the foot print of the monitor riser and do not further occupy the limited desk-top space. Providing other peripheral devices such as CD-ROM drives or diskette drives within the media mounting surfaces is contemplated by the invention and the operation of the riser with these devices in accordance with the disclosure will be apparent to those skilled in the art.

Figure 3:
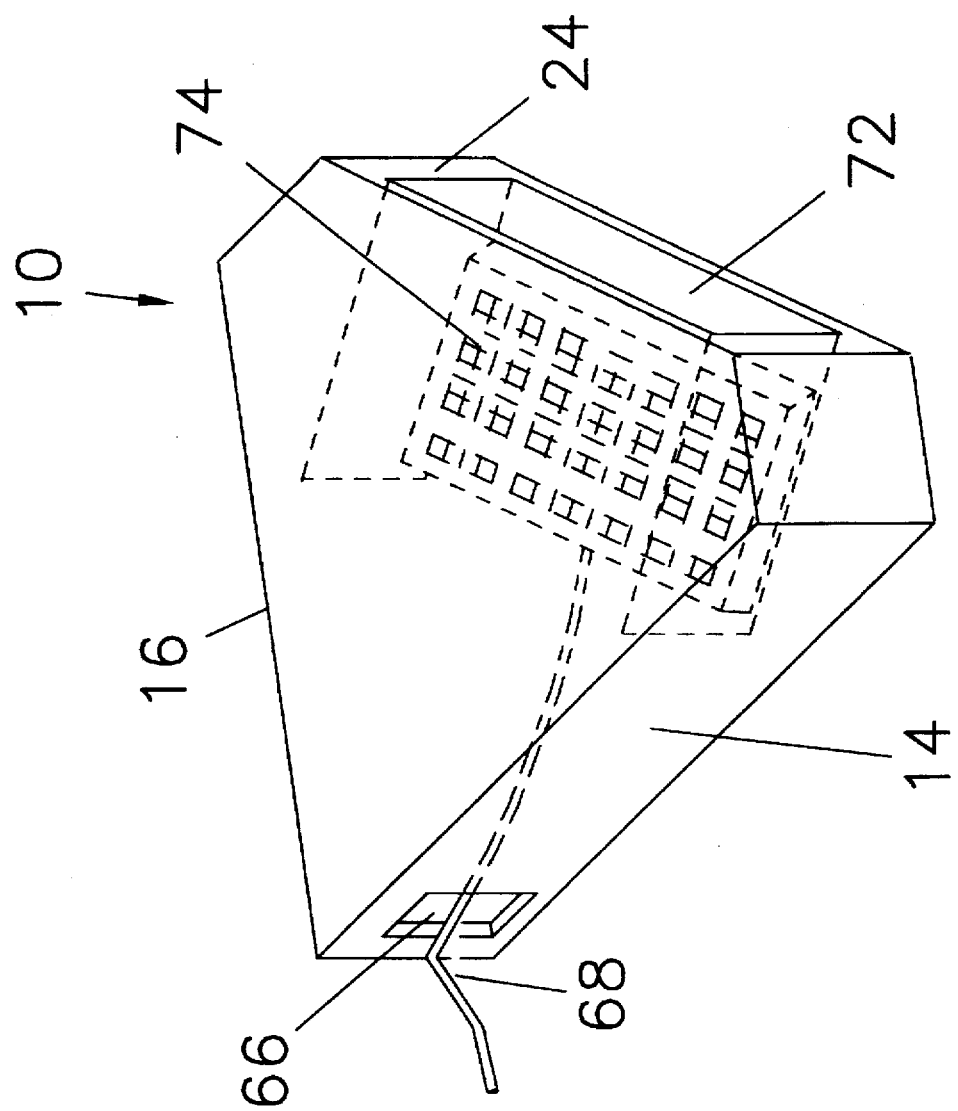
FIG. 3 is a perspective view illustrating details of one embodiment of a monitor riser constructed in accordance with the present invention.

In an alternative preferred embodiment shown in FIG. 3, the user interface 24 has a large cut-out 72, and at least one of the rear side panels 14, 16 has a small cut-out 66. The rear side panels 14, 16 and the media mounting surfaces 26, 28 are spaced apart such that the cut-out 72 accommodates storage of a computer keyboard 74. A keyboard cable 68 attached to the keyboard 74 is contained within the riser 10, extends through a cut out 66, and is attached to the computer system (not shown).

In another embodiment, at least one of the rear side panels 14, 16 is adapted to receive electrical peripheral devices on it. For example, cut outs may be provided for mounting a surge control power strip or a Universal Serial Bus Hub therein. Providing alternative peripheral devices will be apparent to those skilled in the art, and is contemplated by the disclosure of this invention.

The rear side panels 14, 16 are positioned such that the riser 10 may be placed proximate a desk corner 82 as shown in FIG. 2. The rear side panels 14, 16 are dimensioned such that a monitor 76 may be rotatably adjusted by an operator from side to side without having the rear of the monitor substantially traveling beyond the rear side panels 14, 16. Interference problems with walls in close proximity to the desk are thereby eliminated.

Riser 10 is portable in that it may be easily transported from one location to another. The riser 10 may be easily moved from one side of the desk to the opposite side of the desk. Alternatively, it may also be transported to another desk or another work location. Riser 10 is lightweight and may be provided with a handle to facilitate such transportation. In a preferred embodiment, the riser is fabricated from wood. However, it is contemplated that other materials, such as plastic or metal, may also be used.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A portable riser for supporting a computer monitor thereon, comprising:

a generally triangular base having two rear side panels extending from an apex to two media mounting surfaces, said rear side panels being angularly disposed at an angle of about 90 degrees to each other such that said riser fits within a corner; at least one of the rear side panels being adapted for mounting electronic peripheral devices thereon, at least one of said rear side panels having a cut-out therein for receiving a cable therethrough;

said media mounting surfaces extending angularly disposed at about a 90 degree angle from the rear side panels to ends of a user interface surface;

a top support surface supported by the two rear side panels, two media mounting surfaces, and the user interface surface; and said user interface surface having a cut-out therein, said cut-out defining a storage area which is dimensioned such that a computer keyboard may be received therein.

2. The portable riser as recited in claim 1, further comprising a turntable supported on the top support surface such that said monitor is supported thereby and the viewing angle of the monitor may be adjusted by an operator.

3. The portable riser as recited in claim 2, wherein said media mounting surfaces comprise speakers mounted therein.

4. A portable riser for supporting a computer monitor thereon, comprising:

a generally triangular base having two rear side panels extending from an apex to a user interface surface; said rear side panels being angularly disposed with respect to each other such that said riser fits within a corner, the rear side panels being angularly disposed at an angle of about 90 degrees to each other;

a top support surface supported by the two rear side panels and said user interface surface, wherein the rear side panels are angularly disposed at an angle of about 90 degrees to each other; and two media mounting surfaces; each media mounting surface extending from the rear side panel to the end of a user interface surface.

5. The portable riser as recited in claim 4, wherein the media mounting surfaces extend angularly disposed at about a 90 degree angle from the rear side panels.

6. The portable riser as recited in claim 4, further comprising at least one of said surfaces having a speaker mounted therein.

7. The portable riser as recited in claim 6, wherein said media mounting surfaces comprise speakers mounted therein.

8. A portable riser for supporting a computer monitor thereon, comprising:

a generally triangular base having two rear side panels extending from an apex to two media mounting surfaces, said rear side panels being angularly disposed at an angle of about 90 degrees to each other such that said riser can be placed in a corner;

said media mounting surfaces extending angularly disposed at about a 90 degree angle from the rear side panels to ends of a user interface surface, at least one of the rear side panels being adapted for mounting electronic peripheral devices thereon;

a top support surface supported by the two rear side panels, two media mounting surfaces, and the user interface surface, said user interface surface comprises a releasable door for access to a storage area defined thereby, said storage area comprising a drawer for receiving removable computer media therein; said door having a lock mounted thereon;

said top support surface supporting a turntable thereon such that a monitor is supported thereby and the viewing angle of the monitor may be adjusted by an operator; and said media mounting surfaces having speakers mounted therein.

* * * * *